United States Patent [19]

Ito

[11] 4,175,831
[45] Nov. 27, 1979

[54] PHOTOGRAPHIC LENS ASSEMBLY
[75] Inventor: Masaharu Ito, Tokyo, Japan
[73] Assignee: Canon Kabushiki Kaisha, Tokyo, Japan
[21] Appl. No.: 844,839
[22] Filed: Oct. 25, 1977

Related U.S. Application Data

[63] Continuation of Ser. No. 644,318, Dec. 24, 1975, abandoned.

[30] Foreign Application Priority Data

Dec. 28, 1974 [JP] Japan ............................ 50-2496

[51] Int. Cl.² ........................................ G02B 7/02
[52] U.S. Cl. ................................ 350/255; 350/187; 350/252
[58] Field of Search ............... 350/187, 214, 252, 255

[56] References Cited
U.S. PATENT DOCUMENTS

| | | | |
|---|---|---|---|
| 3,038,378 | 6/1962 | Harris et al. | 350/187X |
| 3,752,565 | 8/1973 | Nagashima | 350/187 X |
| 3,773,405 | 11/1973 | Sugano | 350/252 |
| 3,904,275 | 9/1975 | Noguchi et al. | 350/255 X |

*Primary Examiner*—John K. Corbin
*Assistant Examiner*—John D. Lee
*Attorney, Agent, or Firm*—Toren, McGeady and Stanger

[57] ABSTRACT

A photographic lens assembly, comprising:
 a photographic lens system divided into at least a first and a second lens groups,
 an outer cylinder to be fixed to a camera body,
 a middle cylinder having helical threads on both of the outer and the inner surfaces thereof and disposed in thread engagement with said outer cylinder through the outer thread, and
 an inner cylinder disposed in thread engagement with the inner thread of said middle cylinder and prevented from rotational operation by said outer cylinder, being characterized by that this lens assembly is so made that said first lens group is fixedly coupled with said inner cylinder, on the other hand said second lens group is functionally coupled with said middle cylinder while being regulated or guided to the direction along optical axis by a linear guide slot formed at said inner cylinder, and said first and second lens groups are shifted along optical axis with such shifting amounts as being different from each other by rotational operation of said middle cylinder.

13 Claims, 3 Drawing Figures

FIG.2 (THIS INVENTION)

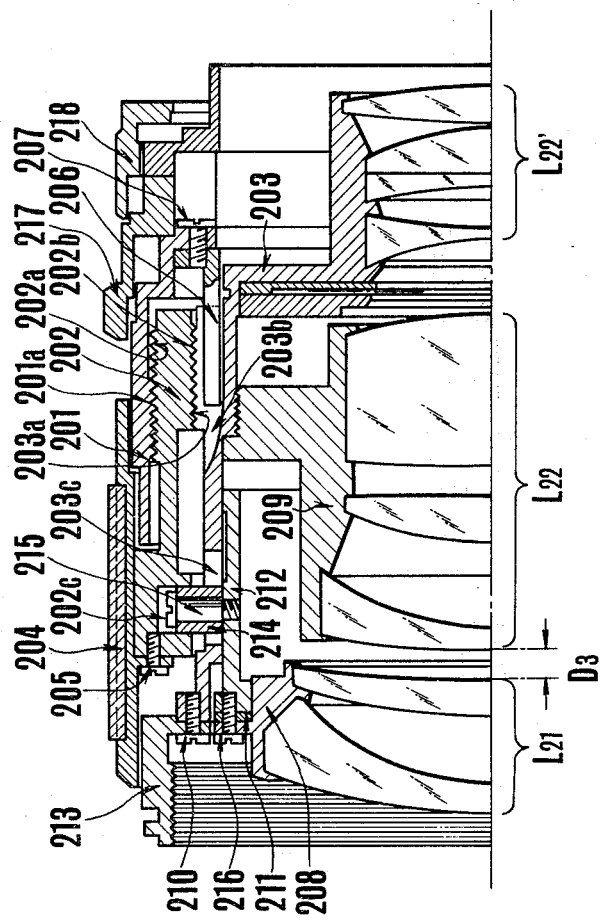
FIG. 3 (THIS INVENTION)

PHOTOGRAPHIC LENS ASSEMBLY

This is a continuation of Application Ser. No. 644,318, filed Dec. 24, 1975 now abandoned.

BACKGROUND OF THE INVENTION

1. Field of the Invention

The present invention relates to a photographic lens assembly, particularly to a photographic lens assembly of such type that a photographic lens system divided into at least two lens groups with an air space therebetween is provided and focusing of said lens system against an object is achieved by shifting said two lens groups along optical axis with such shift amounts as being different to each other.

2. Description of the Prior Art

The photographic lens for a camera is generally so designed that the best correction of aberrations can be achieved at the infinity setting, and as the subject distance decreases the variation of aberrations increases to impair the characteristics of the image. Thus displacement of the lens causes a corresponding change in the characteristics of the image. Photographic lenses of the retrofocus type extensively used for photographic cameras, when displaced, are subject to especially marked variations in aberrations. Moreover, with the tendency in recent years to shorten the closest subject distance, it has become an important problem to remedy the deterioration of characteristics of image due to the variation of aberrations.

To overcome this problem, it is known to divide the photographic lens system into a front lens group and a rear lens group and to move the two groups relative to each other so as to render the air space for infinity setting different from that for close-up setting and thereby correct the variation of aberrations when close-up are taken.

While this method has been proposed by U.S. Pat. No. 3,674,343 by the assignor in the present case granted to Ito et al. (filed Sept. 15, 1970, Ser. No. 72,364, "Lens Barrel," corresponding to German DAS 20 46 261), such arrangement assures good characteristics of image both for infinity setting and close-up setting.

Said "Lens Barrel" proposed by this U.S. Pat. No. 3,674,343 has:

- a photographic lens system divided into a front lens group held by a first frame member and a rear lens group held by a second frame member with an air space therebetween which is variable by the displacement of the two lens groups relative to each other,
- an outer cylinder to be fixed to a camera body,
- a middle cylinder having two helical threads on both of the outer and the inner surface thereof and disposed in thread engagement with the outer cylinder through the outer thread,
- an inner cylinder disposed in thread engagement with the inner thread of the middle cylinder, and
- a focusing ring fixedly attached to the middle cylinder, and is so made that a first key member fixedly attached to the outer cylinder is made to engage with key slot formed at a part of the inner cylinder for preventing the rotational action of said inner cylinder and restricting the same in the direction along the optical axis, at the same time the second frame member holding the rear lens group is fixedly attached to said inner cylinder, on the other hand a flange portion is formed at a forward end part of the first frame member holding the front lens group and said first frame member is functionally associated with the forward end part of the middle cylinder through said flange portion, at the same time a second key member fixedly attached to the second frame member is engaged with a key slot formed at a part of the first frame member for preventing rotational action of the first frame member and restricting the same in the direction along optical axis, so that by rotatingly operating the focusing ring the front lens group and the rear lens group are shifted linearly along optical axis based on the lead of outer thread of the middle cylinder and the synthesized lead of the outer and inner threads of the middle cylinder, respectively, that is with such shift amount as being different each other.

However, there are such disadvantages in said proposed "Lens Barrel" that the key member (that is the above mentioned second key member and the key slot) for regulating or guiding the first frame member to the direction along optical axis while preventing rotational action of the first frame member holding the front lens group is provided at the air space between the front and the rear lens group, thus said air space necessarily increases, therefore, the total length of the "Lens Barrel" increases and a compact "Lens Barrel" can not be obtained.

Next, secondly there are such disadvantages that both functional parts of the first frame member are positioned with too much gap therebetween in such manner that a first functional part (that is the above mentioned flange portion) to be coupled with the middle cylinder in being driven manner is positioned at a forward end part of said frame member while a second functional part (that is the above mentioned key slot) which is to be coupled with the second key member for preventing the rotational action of the first frame member and regulating or guiding the same to the direction along the optical axis, therefore, it is comparatively difficult to always make satisfactory linear driving of said first frame member, particularly when "Lens Barrel" is slanted in use the torque required for driving said first frame member largely varies thus smooth operation of the focusing ring is blocked.

Further, there are such disadvantages that a driving point for the first frame member and a driving point for the second frame member are positioned with too big gap therebetween in the focusing ring, therefore the driving of said both frame members will be very much unbalanced.

SUMMARY OF THE INVENTION

The present invention is made in view of the above mentioned disadvantage and is to provide further improvement in a lens assembly which has been proposed heretofore, particularly it is the chief object to totally eliminate said disadvantages in said lens assembly.

Thus a chief object of the present invention is, in view of said lens assembly having been proposed to date, to provide a unique photographic lens assembly, which is very compact as a whole shortening its total length.

Another object of the present invention is, in view of the above mentioned conventional lens assembly, to provide such unique photographic lens assembly that its total length is shortened to make it very compact as a whole, and particularly the driving of the focusing ring against the front and the rear lens groups is very satisfactorily balanced, and the handling of said focusing ring is always done with a satisfactory smoothness.

For achieving said objects, such characterizing structure of a lens assembly as will be described below. That is, it is such structure of lens assembly that of a photographic lens system divided into at least a front and a second lens groups the first lens group is fixedly coupled with the inner cylinder while the second lens group is functionally coupled with the middle cylinder regulating or guiding the same by a guide slot formed at the inner cylinder to the direction along an optical axis of the lens system, and the first and the second lens groups are shifted with such shift amounts as being different from each other by the rotational operation of the middle cylinder.

The above mentioned characterizing structure of the present invention is realized in a preferred embodiment of the same in the following manner:

That is, said first lens groups is held in place by a first frame member and said first frame member is fixedly attached to the inner cylinder, on the other hand said second lens group is held in place by a second frame member and a pin member is planted on the outer surface of the second frame member, then after having said pin member going through said guide slot formed at the inner cylinder, having it engaged with a peripheral groove formed at the inner surface of the middle cylinder.

It is further proposed in said referred embodiment that a roller member is, in place of said pin member, axially attached to the outer surface of the second frame member in a rotatable manner, and after said roller member is made to go through said guide slot formed at the inner cylinder, it is engaged with said peripheral groove fromed at the middle cylinder, thereby particularly the driving of the second frame member is made smooth, further operating force needed for rotating handling of the middle cylinder.

Now in a preferred embodiment of the present invention the first lens group is formed as a front lens group and the second lens group is formed as a rear lens group. In another preferred embodiment of the present invention, the first lens group is formed as a rear lens group while the second lens group is formed as a front lens group.

Further, other objects and characterizing features of the present invention shall be made clear by detailed explanations referring to drawings attached, will below hereunder.

BRIEF DESCRIPTION OF THE DRAWINGS

FIG. 2 is a vertical cross sectional side elevation view of one embodiment of a photographic lens assembly according to this invention, one half thereof under the center-line being omitted; and FIG. 3 is a vertical cross sectional side elevation view of another embodiment of the photographic lens assembly according to the invention, one half thereof under the centerline being omitted.

DETAILED DESCRIPTION OF THE PREFERRED EMBODIMENTS:

Before making explanations on embodiments of the present invention, explanations will be made on a conventional lens barrel proposed by the above mentioned U.S. Pat. No. 3,674,343, referring to FIG. 1.

Figure 1:
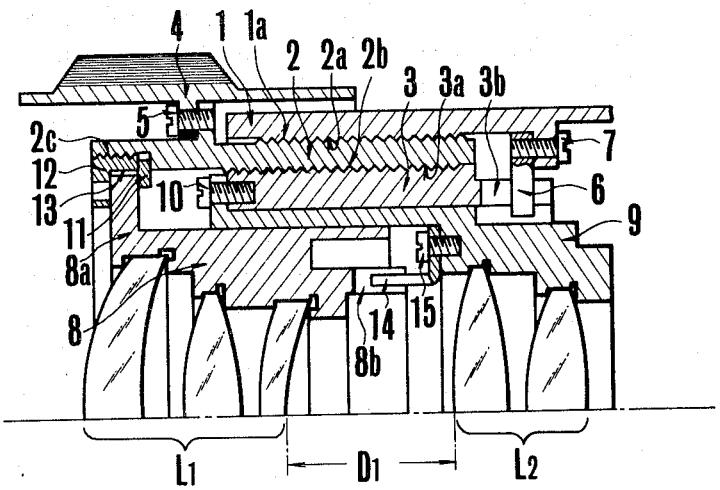
FIG. 1 is a vertical cross sectional side elevation view of a conventional photographic lens assembly provided with a photographic lens system divided into at least two movable lens groups to assure improved characteristics of image at close-up setting, one half of the lens assembly under the center-line being omitted.
Figure 1:
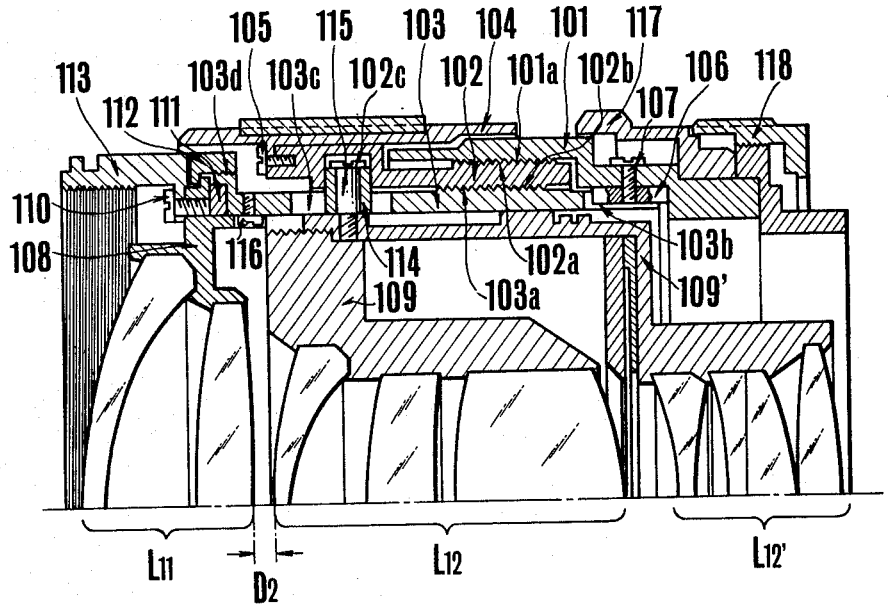

In FIG. 1, 1 is an outer cylinder to be fixedly attached to a camera body (not shown in the drawing), and a helical thread 1a is formed at its inner surface. 2 is a middle cylinder and two helical threads 2a and 2b with different leads from each other are formed at its outer and inner surfaces while a screw portion 2c is formed at inner surface at its forward end part, wherein the middle cylinder 2 threadedly engage with the inner thread 1a of the outer cylinder 1 through the outer thread 2a thereof.

3 is an inner cylinder, and a helical thread 3a is formed at its outer surface while a key slot 3b is formed at its rear end part, wherein the cylinder 3 threadedly engage with the inner thread 2b of the middle cylinder 2 through said outer thread 3a.

4 is a focusing ring being fixedly attached to the middle cylinder by a screw 5. 6 is first key member being engaged with the key slot 3b formed at the inner cylinder 3 to regulate or guide said inner cylinder 3 to a direction along an optical axis of a lens system ($L_1$ and $L_2$) while preventing the rotational action of said inner cylinder 3, and is fixedly attached to the outer cylinder 1 by a screw 7. $L_1$ and $L_2$ indicate a front and a rear lens groups, respectively, which compose the lens system, and said two lens groups $L_1$ and $L_2$ are so arranged as having an air space $D_1$ therebetween. 8 is a first frame member holding the front lens group $L_1$, and a flange portion 8a is formed at its front end part while a key slot 8b is formed at its rear end part.

9 is a second frame member holding the rear lens group $L_2$ and is fixedly attached to the inner cylinder 3 by a screw 10, while the first frame member 8 is retained by the inner surface of the second frame member 9. 11 is a spacer ring to adjust the width of the air space $D_1$. 12 is a screw ring having a step part with such step difference as being a little larger than the width of the flange portion 8a of the first frame member 8, and is fixedly screwed to the screw portion 2c of the middle cylinder 2, wherein the flange portion 8a of the first frame member 8 is engaged with a peripheral groove 13 formed by said spacer ring 11 and the step part of the screw ring 12.

14 is a second key member engaged with the key slot 8b formed at the first frame member 8 to regulate or guide said first frame member 8 to the direction along the optical axis of the lens system while preventing the rotational action of said first frame member 8, and is fixedly attached to the second frame member 9 by a screw 15.

When the focusing ring 4 is rotatingly handled for focusing the lens system ($L_1$ and $L_2$) against an object at a prescribed distance in a lens barrel having the above mentioned set-up, the middle cylinder 2 being integral with said focusing ring 4 is shifted linearly along an optical axis based on the lead of the outer thread 2a while rotating around the optical axis by threaded engagement with the outer cylinder 1. At this time, the first frame member 8 functionally coupled with a forward end part of the middle cylinder 2 through the flange portion 8a is linearly shifted along the optical axis together with the middle cylinder 2 without accompanying rotational action as the second key member 14 is engaged with the key slot 8b at the rear end thereof, thus linear shifting of the front lens group $L_1$ along the optical axis is achieved. Here the shifting of the front lens group $L_1$ at this time is apparently based on the lead of the outer thread 2a of the middle cylinder 2.

On the other hand, the inner cylinder 3 threadedly engaged with the inner thread 2b of the middle cylinder 2 is linearly shifted along the optical axis based on the synthesized lead of the threads 2a and 2b of the middle cylinder 2 while being prevented from rotational action as the first key member 6 is engaged with the key slot 3b at the rear end of said cylinder 3 when the middle cylinder 2 makes rotational operation, thus linear shifting along the optical axis of the rear lens group $L_2$ being held at the second frame member which is integral with said inner cylinder 3 is achieved. Here, the shifting of the rear lens group $L_2$ at this time is apparently based on the synthesized lead of the threads 2a and 2b of the middle cylinder 2.

While a lens barrel proposed by U.S. Pat. No. 3,674,343 is to achieve linear shifting of the front and the rear lens groups $L_1$ and $L_2$ along the optical axis with such shift amounts or shifting directions as being different from each other in a manner mentioned above, as being apparent from the drawings, in this lens barrel, first a means to regulate or guide the first frame member 8 to the direction along the optical axis while preventing the rotational action thereof, that is the key slot 8b of the first frame member 8 and the second key member 14 are provided within the air space $D_1$. Therefore as mentioned previously there is such disadvantage that said air space $D_1$ necessarily increases therefore the total length of the lens barrel increases remarkably. Also there are such disadvantages that the first frame member 8 is being-drivenly coupled with the middle cylinder 2 through the flange portion 8a formed at its forward end part and is also coupled with the second key member 14 through the key slot 8b formed at its rear end part, therefore as mentioned previously it is comparatively difficult to achieve always satisfactory linear driving of said first frame member 8, particularly when it is used with a lens barrel being slanted, the torque necessary for driving said first frame member 8 largely varies blocking smooth handling of the focusing ring 4.

Next, explanations will be made on preferred embodiments of the present invention which is made with an intention of eliminating the above mentioned disadvantages in conventional lens barrels referring to FIGS. 2 and 3.

FIG. 2 shows the set-up of a particularly preferred embodiment of the present invention while FIG. 3 shows the set-up of an important part of another embodiment thereof, and first explanations will be made on the embodiment shown in FIG. 2.

In FIG. 2, 101 is an outer cylinder to be fixedly attached to a camera body (not shown in the drawing), and a helical thread 101a is formed at its inner surface. 102 is a middle cylinder, and two helical threads 102a and 102b with different leads from each other are formed at its outer and inner surfaces, while a peripheral groove 102c is formed at a part of its inner surface, wherein said cylinder 102 is threadly engaged with the inner thread 101a of the outer cylinder 101 through its outer thread 102a.

103 is an inner cylinder and a helical thread 103a is formed at its outer surface, and a key slot 103b is formed at its rear end, while a regulating or guiding slot 103c is formed at a part therebetween, further a screw portion 103d is formed at its forward end part, wherein said cylinder 103 is threadedly engaged with the inner thread 102b of the middle cylinder 102. 104 is a focusing ring being fixedly attached to the middle cylinder 102 by a screw 105.

106 is a key member, being engaged with the key slot 103b formed at the inner cylinder 103, to regulate or guide said inner cylinder 103 to the direction along an optical axis of a lens system ($L_{11}$, $L_{12}$ and $L_{12}'$) while preventing the rotational action of said inner cylinder 103, and is fixedly attached to the outer cylinder 101 by a screw 107.

The lens system is here divided into a first lens group $L_{11}$, a second lens group $L_{12}$ and a third lens group $L_{12}'$, and particularly the first and the second lens groups $L_{11}$ and $L_{12}$ are arranged to have an air space $D_2$ therebetween.

Here, the first lens groups $L_{11}$ corresponds to the front lens group $L_1$ in FIG. 1, while the second and the third lens groups $L_{12}$ and $L_{12}'$ are to correspond to the rear lens group $L_2$ in FIG. 1.

108 is a first frame member holding the first lens group $L_{11}$, and 111 is a spacer ring to adjust the width of the air space $D_2$. 112 is a screw ring to fixedly attach the first frame member 108 to the inner cylinder 103 together with the spacer ring 111, wherein said screw ring 112 is firmly screwed to the screw portion 103d of the inner cylinder 103.

109 is a second frame member holding the second lens group $L_{12}$, and 109' is a third frame member holding the third lens group $L_{12}'$, wherein said third frame member 109' is held by the inner surface of the inner cylinder 103, while the second frame member 109 is fixedly attached to the third frame member 109'.

114 is a roller member axially attached to the outer surface of the third frame member 109' by a pin member 115 in a rotatable manner, and said roller member 114 goes through the guiding slot 103c formed at the inner cylinder 103 and engages with the peripheral groove 102c formed at the middle cylinder 102.

Also, 113 is a front frame cylinder fixedly attached to the first frame member 108 by a screw 110, and 116 is a screw to determine position of the first frame member 108 as said member 108 is mounted to the inner cylinder 103. 117 is a conventionally known diaphragm preset ring. 118 is a clamp ring to fixedly attach the lens assembly shown in FIG. 2 to a camera body not being shown in the drawing as an interchangeable lens assembly.

When the focusing ring 104 is rotatingly handled for focusing the lens system ($L_{11}$, $L_{12}$ and $L_{12}'$) against an object at a prescribed distance in a photographic lens assembly having the above mentioned set-up, the middle cylinder 102 being integral with said focusing ring 104 rotates around the optical axis and makes linear shifting along the optical axis based on the lead of the outer thread 102a by the threaded engagement with the outer cylinder 101.

At that time, the second and the third frame members 109 and 109' makes linear shifting integrally together with the middle cylinder 102 along the optical axis without accompanying rotational action as the roller member 114 coupled with these frame members 109 and 109' goes through the guiding slot 103c formed at the inner cylinder 103 and engages with the peripheral groove 102c formed at the middle cylinder 102, thus integral and linear shifting of the second and the third lens groups $L_{12}$ and $L_{12}'$ can be achieved.

Here the shifting of the lens groups $L_{12}$ and $L_{12}'$ at this time is apparently based on the lead of the outer thread 102a of the middle cylinder 102. On the other hand, the inner cylinder 103 threaded with the inner thread 102b of the middle cylinder 102 makes linear shifting based on the synthesized lead of the threads 102a and 102b of the middle cylinder 102 while being prevented from rotational action as the key member 106 engages with the key slot 103b at rear end of the cylinder 103 when the middle cylinder 102 makes rotational operation, the linear shifting along the optical axis of the first lens group $L_{11}$ being held at the first frame member 108 being integral with said inner cylinder 103 is achieved. The shifting of the first lens group $L_{11}$ is apparently based on the synthesized lead of the threads 102a and 102b of the middle cylinder 102.

In said lens assembly shown in FIG. 2, the shifting along the optical axis of the front lens group (first lens group $L_{11}$) and the rear lens group (second and third lens groups $L_{12}$ and $L_{12}'$) with such shift amount or shifting direction as being different to each other.

Next, another embodiment shown in FIG. 3 will be explained.

In FIG. 3, 201 is an outer cylinder to be fixedly attached to a camera body (not shown in the drawing) and a helical thread 201a is formed at its inner surface. 202 is a middle cylinder, and two helical threads 202a and 202b with different leads from each other are formed at its outer and inner surfaces, while a peripheral groove 202c is formed at a part of its inner surface, wherein said cylinder 202 is threadedly engaged with the inner thread 201a of the outer cylinder 201 through its outer thread 202a.

203 is an inner cylinder, and a helical thread 203a is formed at its outer surface and a key slot 203b is formed at a part of its outer surface further a regulating or guiding slot 203c is formed at a part therebetween, wherein said cylinder 203 is threadedly engaged with the inner thread 202b of the middle cylinder 202 through its outer thread 203a. 204 is a focusing ring being fixedly attached to the middle cylinder 202 by a screw 205.

206 is a key member engaged with the key slot 203b formed at the inner cylinder 203 to regulate or guide said inner cylinder 203 to the direction along an optical axis of a lens system ($L_{21}$, $L_{22}$ and $L_{22}'$) preventing rotational action of said inner cylinder 203, and is fixedly attached to the outer cylinder 201 by a screw 207.

The lens system here is divided into a first lens group $L_{21}$, a second lens group $L_{22}$ and a third lens group $L_{22}'$, and particularly the first and the second lens group $L_{21}$ and $L_{22}$ are so arranged as having an air space $D_3$ therebetween while the third lens group $L_{22}'$ is retained directly by the inner cylinder 203.

Here, the first lens group $L_{21}$ corresponds to the front lens group $L_1$ in FIG. 1, and the second and the third lens groups $L_{22}$ and $L_{22}'$ correspond to the rear lens group $L_2$ in FIG. 1.

212 is a connecting cylinder retained by the inner surface of the inner cylinder 203, and 214 is a roller member axially attached to the outer surface of the connecting cylinder 212 by a pin member 215 in a rotatable manner, wherein said roller member 214 goes through the guiding slot 203c formed at the inner cylinder 203 and engages with the peripheral groove 202c formed at the middle cylinder 202.

208 is a first frame member holding the first lens group $L_{22}$ being fixedly attached to the connecting cylinder 212 by a screw 216 together with a space ring 211 for adjusting the width of the air space $D_3$. 209 is a second frame member holding the second lens group $L_{22}$ and is fixedly attached with thread to the inner cylinder 203.

213 is a front frame cylinder being fixedly attached to a forward end of the inner cylinder 203 by a screw 210, and 217 is a conventionally known diaphragm preset ring, while 218 is a clamp ring to fixedly attach the lens assembly shown in this FIG. 3 to a camera body not being shown in the drawing as an interchangeable lens assembly.

When the focusing ring 204 is rotatingly operated for focusing the lens system ($L_{21}$, $L_{22}$ and $L_{22}'$) against an object existing at a prescribed distance from said system in a photographic lens assembly having the above mentioned set-up the middle cylinder 202 being integral with said focusing ring 204 rotates around the optical axis and is shifted linearly along the optical axis based on the lead of the outer thread 202a by its thread engagement with the outer cylinder 201.

At that time, the connecting cylinder 212 linearly shifts along the optical axis without accompanying rotational action as the roller member 214 connected with said cylinder 212 goes through the guiding slot 203c formed at the inner cylinder 203 and is engaged with the peripheral groove 202c formed at the middle cylinder 202, thus linear shifting along the optical axis of the first lens group $L_{21}$ being held at the first frame member 208 being integral with said connecting cylinder 212 is achieved.

Here, the shifting of the first lens group $L_{21}$ is apparently based on the lead of the outer thread 202a of the middle cylinder 202.

On the other hand, the inner cylinder 203 threadedly engaged with the inner thread 202b of the middle cylinder 202 makes linear shifting based on the synthesized lead of the threads 202a and 202b of the middle cylinder 203 while being prevented from rotational action as the key member 206 is engaged with the key slot 203b when the middle cylinder 202 makes rotational operation, thus integral and linear shifting along the optical axis of the third lens group $L_{22}'$ directly retained by said inner cylinder 203 and the second lens group $L_{22}$ retained by the second frame member 209 integral with said inner cylinder 203 is achieved.

Now the shifting of the second and the third lens groups $L_{22}$ and $L_{22}'$ at this time is apparently based on the synthesized lead of the threads 202a and 202b of the middle cylinder 202.

And in the lens assembly shown in this FIG. 3, linear shifting along the optical axis of the front lens group (first lens group $L_{21}$) and the rear lens group (second and third lens groups $L_{22}$ and $L_{22}'$) as having such shift amounts or shift directions as being different from each other is achieved in the manner mentioned above.

Also in the above mentioned embodiments, both FIGS. 2 and 3 show infinity setting state of the lens systems ($L_{11}$, $L_{12}$ and $L_{12}'$; $L_{21}$, $L_{22}$ and $L_{22}'$), and the helical threads (102a and 102b; 202a and 202b) at each middle cylinder (102; 202) have such directivity of their leads and helicoid as being able to linearly shift the front lens group ($L_{11}$, $L_{21}$) and the rear lens group ($L_{12}$ and $L_{12}'$; $L_{22}$ and $L_{22}'$) along the optical axis in such manner as decreasing the width of the air space ($D_2$; $D_3$) intervening therebetween, in close-up setting of said lens system.

As has been mentioned above such disadvantages in conventionally proposed lens barrel or lens assembly as mentioned above can be entirely eliminated by the present invention. That is, in the lens assembly according to the present invention, one lens group ($L_{11}$ in FIG. 2; $L_{22}$ and $L_{22}'$ in FIG. 3) out of the lens systems ($L_{11}$, $L_{12}$ and $L_{12}'$; $L_{21}$, $L_{22}$ and $L_{22}'$) being divided into at least two lens groups is fixedly coupled with the inner cylinder (103; 203), while the other lens group ($L_{12}$ and $L_{12}'$ in FIG. 2; $L_{21}$ in FIG. 3) is functionally associated with the regulating or guiding slot (103c; 203c) for the direction along optical axis formed at the inner cylinder and with the peripheral groove (102c; 202c) formed at the middle cylinder (102; 202) by the pin member or roller member (114 and 115; 214 and 215) being coupled with said lens group, therefore it is apparent from its structure the width of air space ($D_2$; $D_3$) intervening between said both lens groups can be remarkably reduced, thus the total length of the lens assembly can be shortened and a lens assembly being made to have very compact size as a whole can be achieved. Also since the connecting point for receiving driving of the above mentioned the other lens group ($L_{12}$ and $L_{12}'$; $L_{21}$) to be functionally coupled with the middle cylinder against said middle cylinder and the regulating point of said lens group to the direction along optical axis completely matches with each other, always satisfactory linear shifting can be also achieved for said the other lens group, thus such advantages can be obtained that the handling of the focusing ring (104; 204) can be made very smooth regardless of the state of use of the lens assembly, at the same time the driving of said both lens groups by said focusing ring can be satisfactorily balanced.

What is claimed is:

1. A lens assembly for use with a camera body, comprising:
   (A) a lens system including at least first and second lens groups, said lens system having an optical axis, and said first and second lens groups being shiftable along the optical axis for focusing the lens system;
   (B) first cylindrical means adapted to be affixed to the camera body for securing the lens assembly to the camera body;
   (C) second cylindrical means coaxial with said first cylindrical means for imparting relative movement between said first and second cylindrical means and having outer and inner surfaces and a circular groove on the inner surface thereof terminating radially before reaching the outer surface;
   (C') first shifting means having a first shift rate on the outer surface of said second cylindrical means and operatively engaging said second cylindrical means with said first cylindrical means for moving said second cylindrical means along the optical axis when said second cylindrical means is rotated around the optical axis;
   (D) third cylindrical means having a guide slot substantially parallel to the optical aixs;
   (D') second shifting means having a second shift rate on the inner surface of said second cylindrical means and engaging said third cylindrical means with said second cylindrical means for moving said third cylindrical means along the optical axis in response to rotation of the second cylindrical means when said third cylindrical means is held rotationally stationary around the optical axis relative to said first cylindrical means;
   (E) said first lens group being fixedly connected with said third cylindrical means and shifted along the optical axis by the axial movement of the third cylindrical means when said second cylindrical means is rotated around the optical asix; and
   (F) connecting means fixedly connected with the second lens group and engaging with said groove of the second cylindrical means while projecting through said guide slot of the third cylindrical means for operatively connecting said second lens group with said second cylindrical means;
   (G) said connecting means guiding said second lens group axially by movement along the guide slot of the third cylindrical means, said connecting means shifting said second lens group along the optical axis in response to the axial movement of said second cylindrical means by the operative engagement with said groove of the second cylindrical means when the second cylindrical means is rotated around the optical axis;
   (H) said connecting means being arranged for transmitting axial movement of said second cylindrical means to move said second lens group along the optical axis without rotating the second lens group so that said first lens group is actuated by said outer and inner shifting means while said second group is actuated only by said outer shifting means.

2. An assembly according to claim 1, wherein said first and second shifting means of said second cylindrical means on the outer and inner surfaces of the second cylindrical means include outer and inner helical threads with different pitches, so that rotation of the second cylindrical means shifts said first lens group along the optical axis on the basis of the combined pitch of said outer and inner helical threads while said second lens group is shifted on the basis of only the pitch of said outer helical thread.

3. A lens assembly according to claim 1, further comprising;
   regulating means for preventing said third cylindrical means from rotation around the optical axis, said regulating means being fixedly provided on a portion of said first cylindrical means and operatively engaged with the third cylindrical means.

4. A lens assembly according to claim 3, wherein said third cylindrical means includes an engaging portion substantially parallel to the optical axis for operative engagement with said regulating means; said regulating means being operatively engaged with said engaging portion, and said third cylindrical means being prevented from rotation around the optical axis by the engagement of said engaging portion with said regulating means.

5. A photo-taking lens assembly according to claim 1, further comprising:
   first frame means for holding said first lens group, said first frame means being fixedly attached to said third cylindrical means; and
   second frame means for holding said second lens group, said second frame means being disposed inside of said third cylindrical means;
   said connecting means being fixedly attached to a portion of said second frame means.

6. A lens assembly according to claim 5, wherein said connecting means includes:

a pin member fixedly attached to said portion of said second frame means; and a roller member rotatably supported by said pin member, said roller member being operatively engaged with said groove of said second cylindrical means while projecting through said guide slot of said third cylindrical means.

7. A lens assembly according to claim 1, wherein said first lens group is disposed on the optical axis as a front lens group, while said second lens group is disposed as a rear lens group on the optical axis.

8. A lens assembly according to claim 1, wherein said first lens group is disposed on the optical axis as a rear lens group, while said second lens group is disposed as a front lens group.

9. A lens assembly for use with a camera body, comprising:

(A) a lens system including at least first and second lens groups, said lens system having an optical axis, and said first and second lens groups being shiftable along the optical axis for focusing the lens system;

(B) an outer cylinder adapted to be fixed to the camera body, said outer cylinder having a first helical thread with a given pitch on an inner surface thereof and axially regulating means fixedly provided on a portion thereof;

(C) a middle cylinder having:

a second helical thread with the same pitch as that of said first helical thread of the outer cylinder, said second helical thread being provided on an outer surface of the middle cylinder;

a third helical thread, said third helical thread being provided on an inner surface of the middle cylinder; and a right circular cylindrical groove on the inner surface of the middle cylinder, said groove terminating radially before reaching the outer surface and extending about the optical axis;

said first helical thread of the outer cylinder being engaged with said second helical thread;

said middle cylinder being operatively coupled with said outer cylinder through the thread engagement of the second helical thread thereof with the first helical thread of the outer cylinder and movable along the optical axis relative to the outer cylinder according to the pitch of the second helical thread by its own rotation around the optical axis relative to the outer cylinder;

(D) an inner cylinder having a fourth helical thread on an outer surface thereof with the same pitch as that of said third helical thread of the middle cylinder and a guide slot substantially parallel to the optical axis, said third helical thread of the middle cylinder being engaged with said fourth helical thread, said inner cylinder being movable along the optical axis in response to rotation of the middle cylinder while being prevented from rotation around the optical axis by said axially regulating means of said outer cylinder;

said first lens group being fixedly connected with said inner cylinder and shifted along the optical axis by the axial movement of the inner cylinder when said middle cylinder is rotated around the optical axis; and (E) connecting means for operatively connecting said second lens group with said middle cylinder, said connecting means being fixedly connected with the second lens group and engaging with said groove of the middle cylinder while projecting through said guide slot of the inner cylinder;

said second lens group being guided along the optical axis by said guide slot of the inner cylinder and shifted along the optical axis by the axial movement of said middle cylinder through engagement of said connecting means with said groove of the middle cylinder when the middle cylinder is rotated; said connecting means transmitting axial movement of said middle cylinder to move said second lens group along the optical axis without causing rotation so that said first lens group is actuated with the help of the combined pitch of said second and third helical threads while said second lens group is actuated with the help of only the pitch of the second helical thread.

10. A lens assembly according to claim 9, further comprising:

a first lens frame for holding said first lens group, said first lens frame being fixedly attached to said inner cylinder; and a second lens frame for holding said second lens group, said second lens frame being disposed inside of said inner cylinder;

said connecting means being fixedly attached to a portion of said second lens frame.

11. A lens assembly according to claim 10, wherein said connecting means includes;

a pin member fixedly attached to said portion of said second lens frame; and a roller member rotatably supported by said pin member, said roller member being operatively engaged with said circular groove of said middle cylinder while projecting through said guide slot of said inner cylinder.

12. A lens assembly according to claim 9, wherein said first lens group is disposed on the optical axis as a front lens group, while said second lens group is disposed on the optical axis in the rear of said first lens group as a rear lens group.

13. A lens assembly according to claim 9, wherein said first lens group is disposed on the optical axis as a rear lens group, while said second lens group is disposed on the optical axis in front of said first lens group as a front lens group.

* * * * *